(12) United States Patent
Simonneau et al.

(10) Patent No.: US 8,787,721 B2
(45) Date of Patent: Jul. 22, 2014

(54) RARE EARTH-DOPED FIBER OPTIC DEVICE FOR EMITTING OR AMPLIFYING A SIGNAL IN THE "S" BAND

(75) Inventors: Christian Simonneau, Nozay (FR); Ekaterina Burov, Boulogne-Billancourt (FR); Sébastien Fevrier, Limoges (FR)

(73) Assignee: Alcatel Lucent, Boulogne Billancourt (FR)

( * ) Notice: Subject to any disclaimer, the term of this patent is extended or adjusted under 35 U.S.C. 154(b) by 351 days.

(21) Appl. No.: 12/734,472

(22) PCT Filed: Nov. 7, 2008

(86) PCT No.: PCT/FR2008/052018
§ 371 (c)(1),
(2), (4) Date: Sep. 22, 2010

(87) PCT Pub. No.: WO2009/068800
PCT Pub. Date: Jun. 4, 2009

(65) Prior Publication Data
US 2011/0033162 A1 Feb. 10, 2011

(30) Foreign Application Priority Data
Nov. 9, 2007 (FR) ...................................... 07 58946

(51) Int. Cl.
*G02B 6/036* (2006.01)

(52) U.S. Cl.
USPC ............ 385/127; 385/123; 385/124; 385/126

(58) Field of Classification Search
None
See application file for complete search history.

(56) References Cited

U.S. PATENT DOCUMENTS

| | | | | |
|---|---|---|---|---|
| 5,802,236 | A * | 9/1998 | DiGiovanni et al. | 385/127 |
| 6,606,440 | B2 * | 8/2003 | Hasegawa et al. | 385/125 |
| 6,892,018 | B2 * | 5/2005 | Libori et al. | 385/127 |

(Continued)

FOREIGN PATENT DOCUMENTS

| | | |
|---|---|---|
| EP | 0 810 453 | 12/1997 |
| WO | WO 01/88578 | 11/2001 |

OTHER PUBLICATIONS

S. Février et al., "Very large effective area singlemode photonic bandgap fibre" Electronics Letters, IEE Stevenage, Great Britain, vol. 39, No. 17, Aug. 21, 2003, pp. 1240-1242.

(Continued)

*Primary Examiner* — Uyen Chau N Le
*Assistant Examiner* — Chad Smith
(74) *Attorney, Agent, or Firm* — Harness, Dickey & Pierce

(57) ABSTRACT

Device for the emission or amplification of a signal, comprising an optical fiber (1) having a solid core (2) of refractive index $n_c$, made of a silica glass doped with a rare earth, such as erbium, ytterbium or neodymium, said core being surrounded by an optical cladding (3, 4, 5, 6, 7, 8) comprising at least a pair of silica layers composed of a first, inner layer (3), having a refractive index greater than the refractive index $n_c$ of the core (2), covered by a second, outer layer (4). The optical fiber (1) comprises several pairs of silica layers (3, 4; 5, 6; 7, 8) around the core (2), each pair comprising an inner layer (3, 5, 7) of refractive index $n_i$ and an outer layer (4, 6, 8) of refractive index $n_e$, the refractive index $n_e$ of the outer layer being lower that the refractive index $n_i$ of the inner layer of the same pair.

11 Claims, 3 Drawing Sheets

(56) References Cited

U.S. PATENT DOCUMENTS

| | | | |
|---|---|---|---|
| 6,970,631 B2 | 11/2005 | Arbore | |
| 7,072,553 B2 * | 7/2006 | Johnson et al. | 385/127 |
| 7,079,309 B1 | 7/2006 | Lin et al. | |
| 2004/0156401 A1 | 8/2004 | Sandrock et al. | |

OTHER PUBLICATIONS

Viale et al., "Modal properties of solid-core photonic bandgap fibers" Photonics and Nanostructures, Elsevier, Amsterdam, The Netherlands, vol. 4, No. 2, May 2006, pp. 116-122.

S. Fevrier et al., "Low-loss singlemode large mode area all-silica photonic bandgap fiber" Optics Express Opt. So. America USA, vol. 14, No. 2, Jan. 23, 2006, pp. 562-569.

Roy Philippe et al., "Microstructure fibres and applications" Clea/Europe- IQEC 2007, European Conference on Lasers and Electro-Optics and the International Quantum Electronics Conference, Jun. 17, 2007, p. 729.

Katagiri et al., "Fabrication of silica-core photonic bandgap fiber with multilayer cladding" Optical Fiber Communicaiton Conference 2004, OFC 2004 Los Angeles, CA, Feb. 23-25, 2004, pp. 707-709.

F. Brechet et al., "Singlemode propagation into depressed-core-index photonic-bandgap fibre designed for zero-dispersion propagation at short wavelengths" Electronics Letters, IEE Stevenage, Great Britain, vol. 36, No. 6, Mar. 16, 2000, pp. 514-515.

I. Alam et al., "Classification and properties of radiation and guided modes in Bragg fiber" Optics Communications, North-Holland Publishing Co., Amsterdam, The Netherlands, vol. 250, No. 1-3, Jun. 1, 2005, pp. 84-94.

J. Marcou et al., "Design of weakly guiding Bragg fibres for chromatic dispersion shifting towards short wavelengths; Design of weakly guiding Bragg fibres for chromatic dispersion shifting towards short wavelengths" Journal of Optics. A, Pure and Applied Optics, Institute of Physics Publishing, Bristol, Great Britain, vol. 3, No. 6, Nov. 1, 2001, pp. S144-S153.

S. Fevrier et al., "Ytterbium-doped fibre lasers with tailored all-solid microstructured cladding" Proceedings of SPIE—The International Society for Optical Engineering—Photonic Crystal Fibers II 2008 SPIE US, vol. 6990, Apr. 2008, pp. 69900M-1-6990M-6.

S.D. Hussain, et al., "Analysis of S-band EDFA Utilising Macrobending Approach", 2010 International Conference on Photonics (ICP), ICP2010-79.

Hirotaka Ono, et al., "S-Band Erbium-Doped Fiber Amplifiers with a Multistage Configuration—Design, Characterization, and Gain Tilt Compensation", Jour of Lightwave Technology, vol. 21, No. 10, Oct. 2003; pp. 2240-2246.

S.W. Harun, et al., "An overview on S-band erbium-doped fiber amplifiers", The Laser Physics Letter 4, No. 1, 2007; pp. 10-15.

Hirotaka Ono, et al., "Gain-Flattened $Er^{3+}$—Doped Fiber Amplifier for a WDM Signal in the 1.57-1.60-μm Wavelength Region", IEEE Photonics Technology Letters, vol. 9, No. 5, May 1997; pp. 596-598.

* cited by examiner

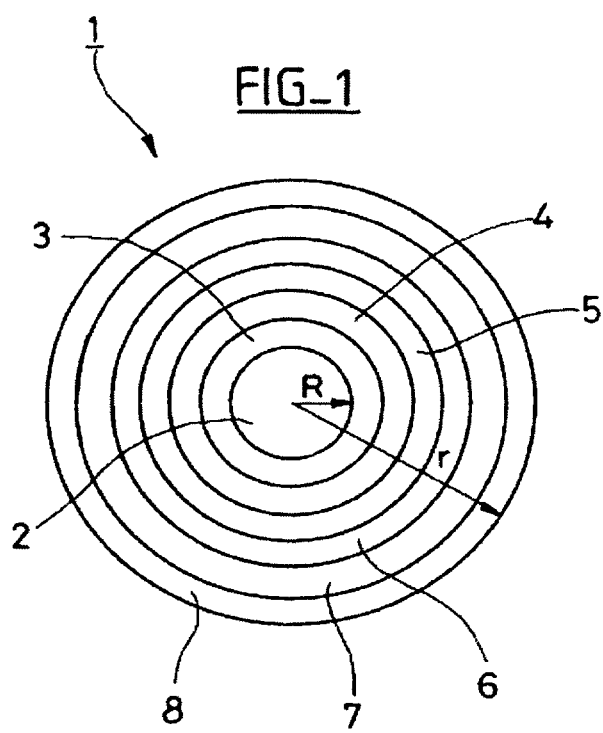
FIG_1
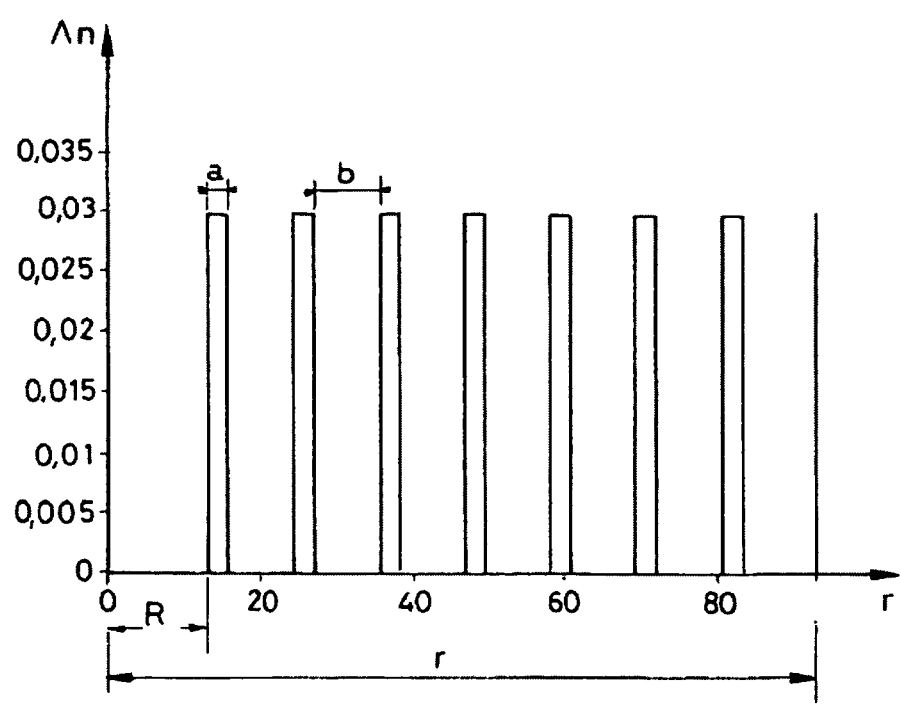
FIG_2

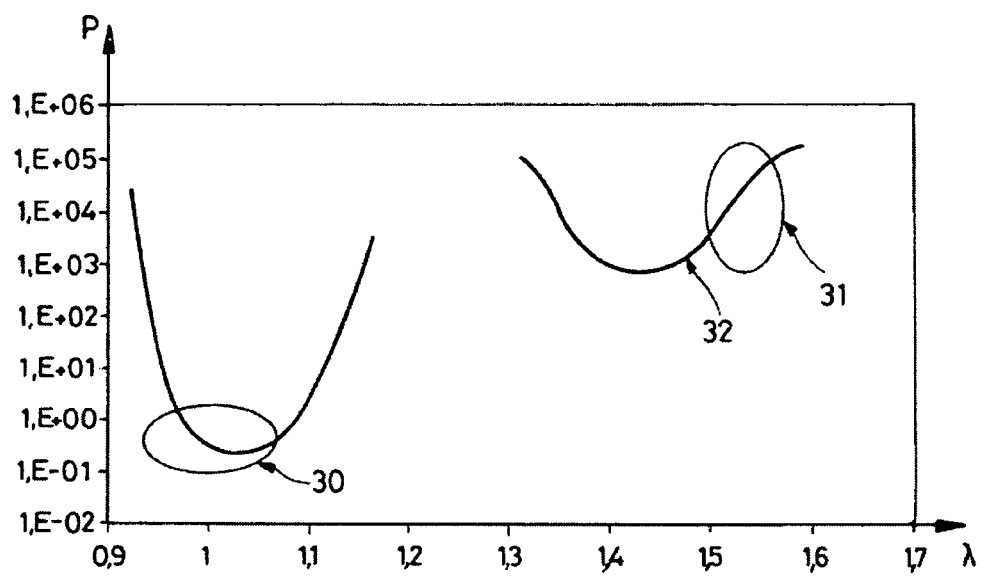
FIG_3
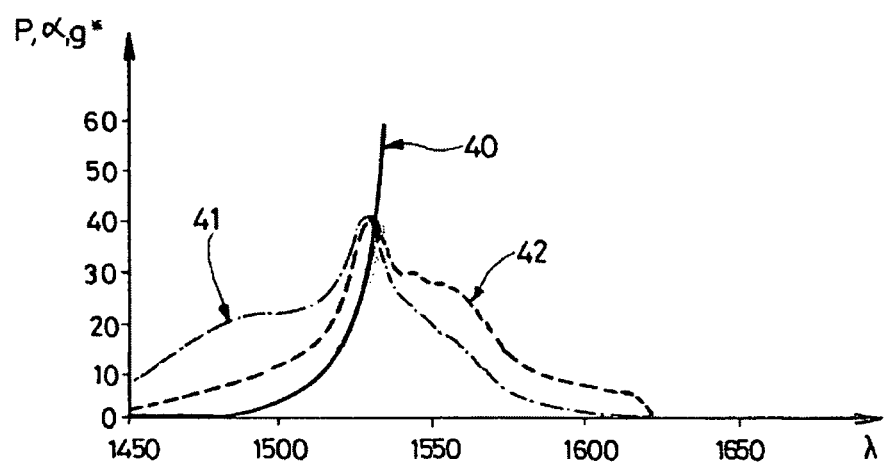
FIG_4

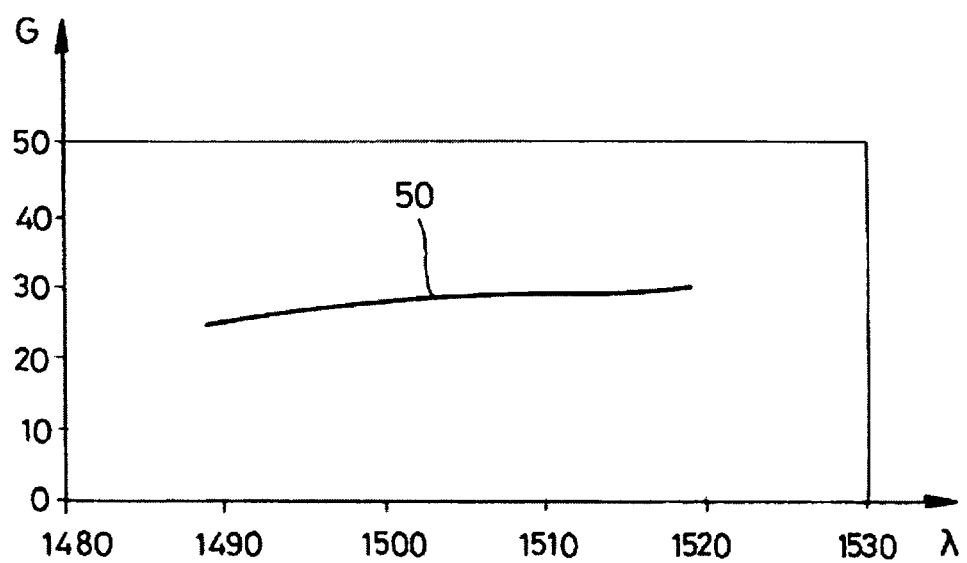
FIG_5

RARE EARTH-DOPED FIBER OPTIC DEVICE FOR EMITTING OR AMPLIFYING A SIGNAL IN THE "S" BAND

The present invention pertains to a device comprising a silica-based optical fiber containing rare earths as a doping agent, in order to emit a signal or an amplified signal located within the range of wavelengths known as the "S" band (for "Short Band"), meaning that which corresponds to wavelengths of less than about 1530 nm.

The invention pertains to devices which use a rare earth-doped optical fiber for emitting or amplifying a light signal. Fiber-optic amplifiers comprise an amplifying fiber which operates on the principle known as stimulated emission, according to which a material may emit a light wave of the same wavelength and same phase as the light wave transmitted, by exciting said material via a high-energy light source, such as a pump laser, whose wavelength is less than that of the signal transmitted within the fiber. The main amplifying elements used are commonly rare earths, such as erbium or ytterbium for example, and are generally integrated as doping agents within the single-mode core or in the vicinity of that single-mode core of the fiber. The pump signal creates a population inversion and thereby enables these ions to become active. If the amplifying fiber is inserted into an optical cavity, a laser may be created for emitting a light signal.

In a known manner, it is thought to increase the performance of erbium-doped fiber optical amplifiers. These amplifiers known as "EDFAs" (for "Erbium Doped Fiber Amplifier") are generally used along long-distance optical links in order to amplify wavelength division multiplexed signals.

These EDFA amplifiers comprise an optical fiber whose core or whose area in the vicinity of the core is erbium-doped, which provides an amplifying transition on the wavelength of 1550 nm. The fibers are designed to obtain the most effective possible amplification within the domain of wavelength known as the "C" band (for "Conventional Band"), which corresponds to wavelengths between 1530 nm and 1565 nm, and the "L" band (for "Large Band") which corresponds to wavelengths located between 1565 nm and 1625 nm.

In this situation, the problem arises of amplifying signals whose wavelengths are less than these values, which correspond to the so-called S band whose wavelengths fall between 1450 nm and 1530 nm. Amplification within this band of wavelength exhibits the major benefit of making it possible to increase the transmission capacity of optical systems.

It is possible to create thulium-doped TDFA amplifiers capable of amplifying within the S band. However, these amplifiers exhibit the drawback of only being usable with fluorine-based fibers. These fibers cannot be connected to conventional silica-based fibers.

It is also possible to create EDFA amplifiers with silica-based fibers while introducing losses for wavelengths located around and above 1530 nm, in order to encourage gains below 1530 nm. These losses may be obtained in two different ways.

First, the erbium-doped fiber can be cut apart, and a Bragg grating may be inserted between the two resulting parts. However, the losses must be distributed across the entire wavelength of the amplifying fiber which makes it necessary to use several Bragg gratings, and therefore to cut the fiber multiple times. This solution is described in an article by H. Ono et al. entitled "S-Band erbium doped fiber amplifiers with a multi-stage configuration-design, characterization, and gain tilt compensation" (IEEE, Jnl. of Lightwave Techn. 2003, 21(10), 2240-2246). This solution is costly, complicated, and inefficient.

Second, the document U.S. Pat. No. 6,970,631 proposes adapting the erbium-doped fiber's refraction index in order to produce a major loss above 1530 nm. This solution particularly consists of adopting a fiber refraction index with a W-shaped profile. Although this solution gives amplification within the S band, the resulting gain is not flat. Instead, this particular index profile enables cladding-mode resonance, which causes losses at the center of the band. In order to avoid this cladding-mode resonance, it is possible to dope the optical cladding with an absorbing element, but if this is done, the gain bandwidth within the S band becomes very limited.

The document U.S. Pat. No. 7,079,309 pertains to an optical amplifier in which a photonic crystal is used to control gain profile. The crystal comprises a dialectic periodic structure having a Photonic Band Gap (or PBG). The three-dimensional structure is made up of silicon-based bars doped with erbium ions. The dialectic periodic structure comprises a plurality of micro-cavity defects.

However, the photonic band gap according to this document is such that the cavity resonances will make it possible to reduce the gain's natural excursion in the C band.

The purpose of the present invention is to eliminate the drawbacks of the prior art, and in particular to disclose a device for producing or amplifying a signal over at least the majority of the S band.

A further purpose of the invention is to propose an easy-to-create, efficient, and inexpensive device.

Yet another further purpose of the invention is to produce amplification within the S band exhibiting a relatively flat gain.

The object of the present invention is a device comprising an optical fiber with the photonic band gap comprising a solid core made up of rare-earth-doped silica glass whose refraction index is $n_c$, surrounded by an optical cladding comprising N pairs of silica layers around the core, in which N is a whole number greater than 2, each pair being composed of a first inner layer with a thickness $d_i$ and a refraction index $n_i$ greater than the refraction index $n_c$ of the core, covered with a second outer layer with a thickness $d_e$ and refraction index $n_e$, the refraction index $n_e$ of the outer layer being less than the refraction index $n_i$ of the same pair's inner layer.

The general principle of the invention consists of creating losses at certain wavelengths using a fiber with a solid-core photonic band gap containing a doping agent which is a rare earth. The fiber is preferentially single-mode with a rare earth-doped silica glass core. The rare earth doping agent is preferably chosen from among erbium, ytterbium, and neodyme. This makes it possible to create, over the entire length of the fiber, signal propagation losses on wavelengths in which the doping ion's gain is high, such as around 1525 nm for the erbium ion. These losses will make it possible to encourage spectral areas in which the gain provided by the rare earth ion is lower, such as between around 1490 nm and 1520 nm for the erbium ion. For neodyme ions, losses are created in the spectral zone from 1020 nm to 1070 nm. For ytterbium ions, losses are created in the spectral zone from 1050-1100 nm.

According to one advantageous embodiment, the thickness $d_e$ of the outer layer is greater than the thickness $d_i$ of the inner layer for a single pair.

According to one embodiment of the invention, the thicknesses of the inner layers are equal.

According to another embodiment of the invention, the thicknesses of the outer layers are equal.

Preferentially, the thickness of the outer layer is at least equal to twice the thickness of the inner layer.

According to one particular embodiment, the rare-earth doping agent is dispersed in the form of ions or nanoparticles in at least one part of the core, meaning that it may be dispersed within the entire single-mode core or just in one part. Most commonly, the active spaces dispersed within the silica fiber are in the form of trivalent ions. The doping agent's nanoparticles have a size which depends on the accepted losses, on the desired concentration of rare earth, and on the composition of the nanoparticle. This size is typically between 2 nm and 20 nm.

The rare earth ions may be seen as 4-level systems within certain ranges of wavelengths, and 3-level systems for lesser wavelengths. It is known how to obtain a sufficient inversion within a three-level system in order to enable a major gain (or emission coefficient). However, this inversion also enables a much greater gain (or emission coefficient) within the 4-level system for higher wavelengths, thereby prohibiting a gain for the three-level system. The invention, by selectively creating losses within the 4-level system, thereby makes it possible to create an amplifier or a laser within the 3-level system.

With an ytterbium-doped fiber, the invention makes it possible to create losses around 1100 nm and encourage gains around 980 nm, and thereby create a device for emission (such as a laser) or amplification (such as an amplifier) at around 980 nm. With a neodyme-doped fiber, it is even possible to create losses around 1050 nm and encourage gains around 915 nm, and thereby create an amplifier or laser operating around 915 nm.

The core may further be built by other doping agents, such as aluminum Al, germanium Ge, phosphorus P, and/or fluorine F, in order to adjust the core's index in relation to the cladding's index. The doping agent may be added to the silica matrix in the form of ions or nanoparticles. The low-index outer layers may be made of non-doped silica or of Ge-, P- and/or F-doped silica. The high-index inner layers may be made of Ge- and/or P-doped silica.

According to one embodiment of the invention, the inner layers' refraction indices are equal.

According to another embodiment, the outer layers' refraction indices are equal.

According to yet another embodiment, the refraction indices of the outer layers are equal to the core's index.

The cladding with a periodically high and low index causes distributed reflection for some specific wavelength radiation coming from the core. These specific wavelengths belong to a photonic band gap of the cladding. Radiation at wavelengths which do not belong to the band gap are not guided within the fiber's core, but rather leak through the cladding. The central wavelength of the band gap directly depends on the thicknesses of the layers making up the cladding by means of the relationship $$\frac{2\pi}{\lambda} d \sqrt{n^2 - n_{ef}^2} = \frac{\pi}{2}$$

in which d is the thickness and n is the index of the layer in question, $n_{ef}$ is the effective index of the guided mode within the core, and $\lambda$ is the central wavelength, According to the invention, the optical fiber comprises N pairs of layers, each pair comprising an inner layer and an outer layer. The number N of pairs within the fiber according to the invention is at least equal to 2. According to a preferred variant embodiment, the number N of layer pairs is at least equal to 5.

According to another variant, the radius r of the fiber is at least equal to twice the radius R of the core.

An optical fiber according to the present invention possesses photonic band gap guiding properties designed such that it cancels out the rare earth gain within the traditional amplification band, known as the C band, in order to enable amplification within the short wavelength band, known as the S band. Naturally, the level of attenuation at undesired wavelengths obtained with the photonic band gap (PBG) structure must be of a sufficient order of magnitude to make it possible to attenuate the amplification gain at these wavelengths. This invention makes it possible to obtain a much flatter gain within the S band than earlier solutions.

Another benefit of the present invention is that the fiber may easily be manufactured by an industrial process, particularly by an "MCVD" process (for "Modified Chemical Vapor Deposition").

Other characteristics and advantages of the present invention will become apparent upon reading the following description of one embodiment, which is naturally given by way of a non-limiting example, and in the attached drawing, in which:

FIG. 1 is a cross-section view of the fiber according to one embodiment of the invention, FIG. 2 represents the profile of the refraction index according to one radius of the fiber, FIG. 3 shows, depending on the wavelength $\lambda$ in μm along the x-axis, the variation in propagation losses P within the fiber in dB/km, FIG. 4 shows the profile of propagation losses P compared to the absorption coefficient α and emission coefficient g* of the erbium, the profile of the losses P; the absorption coefficient α and the emission coefficient g* in dB/km are given on the y-axis, and the wavelength $\lambda$ in nm is given on the x-axis.

FIG. 5 shows the gain obtained with the fiber of FIG. 2; the gain G in dB is given on the y-axis, and the wavelength $\lambda$ in nm is given on the x-axis.

A single-mode optical fiber according to one embodiment of the invention, having a solid rare earth-doped core and possessing photonic band gap guiding properties, is represented in a cross-section view in FIG. 1. The fiber 1 with radius r comprises a solid core 2 with radius R and refraction index $n_c$, made up of silica doped by ions or nanoparticles of erbium. The core 2 is surrounded by an optical cladding comprising a first pair of layers composed of a first layer 3 also made of silica and having a refraction index $n_1$ strictly greater than that of the core, such that $n_1 > n_c$ and a second layer 4 made of doped silica and having a refraction index $n_2$ less than that of the first layer, such that $n_2 < n_1$. The cladding further comprises a second pair of layers of the same nature, surrounding the first pair and analogous to the first pair, made up of a first layer 5 with refraction index $n_3$ such that $n_3 > n_c$ and a second layer 6 with refraction index n4 such that $n_4 < n_3$. In the example given here, the cladding further comprises a third pair of layers, surrounding the second pair and analogous to the first and second pairs, made up of a first layer 7 with a refraction index $n_5$ such that $n_5 > n_c$, and a second layer 8 with a refraction index $n_6$ such that $n_6 < n_5$. The fiber may further be covered with a protective coating made of a polymer material, which is not depicted. A low-index polymer is preferentially chosen.

In the embodiment of the invention illustrated in FIG. 2, the optical fiber with radius r comprises a multiple optical cladding made up of seven pairs of analogous layers. The core has a radius R=12.7 µm and a refraction index of $n_c$. The core is surrounded by a first layer whose thickness a is =2.5 µm and whose refraction index is $n_1$ such that $n_1-n_c=\Delta n$, here with $\Delta n=0.03$. The first layer is followed by a second layer whose thickness b=8.5 µm and whose refraction index is $n_2$, here such that $n_2=n_c$. The following layers continue likewise, alternating high-refraction index and low-index layers and their respective thicknesses.

The optical fibers according to one embodiment of the invention have a particular propagation behavior, which depends on the total number of layers, on their refraction index, and on their thickness. The values of parameters a, b, N and $\Delta n$ may be modified provided that the outer diameter OD of the optical fiber is adjusted when the preform is stretched.

The table below shows, for a few examples of variations regarding the value of one of the parameters a, b, N and $\Delta n$, the relative variations $\delta OD$ of the outer diameter OD, which are necessary to achieve the initial propagation conditions.

TABLE 1

| (a) | | (b) | | (c) | | (d) | |
|---|---|---|---|---|---|---|---|
| $\delta N$ | $\delta OD, \%$ | $\delta a, \%$ | $\delta OD, \%$ | $\delta b, \%$ | $\delta OD, \%$ | $\delta \Delta n, \%$ | $\delta OD, \%$ |
| −1 | 2 | 4 | 1.3 | −1.12 | 2 | −17 | 14 |
| −2 | 4.5 | 8 | 2.2 | 1.12 | 4 | 17 | −3.5 |

For example, if the number of layers is reduced by one 1: $\delta N=-1$, the outer diameter OD must increase by 2%: $\delta OD=+2\%$ so that the result remains unchanged.

One example of propagation loss P of the signal based on the wavelength $\lambda$, within a fiber as previously described, is given in FIG. 3. The spectral variation of the propagation losses shows a low value of emission wavelength losses of the pump laser ($\lambda=980$ nm) (zone 30) and a high value of losses at wavelengths greater than $\lambda=1530$ nm (zone 31). It is observed that at the wavelengths belonging to the targeted S band meaning between 1450 nm and 1530 nm, the value of the propagation losses is relatively low (zone 32).

As a reminder, the general principle of the invention consists of creating losses at certain wavelengths with the assistance of a photonic band gap fiber with a solid core doped with rare earths. In this example, the pump radius will be correctly propagated in the fiber, and the signal; bands C and L will be heavily attenuated, which will enable the amplification of the signal in the S band.

We now consider FIG. 4 which shows the variation of the profile of propagation losses P (curve 40), the erbium absorption coefficient $\alpha$ (curve 41) and the emission coefficient g* of the erbium (curve 42) based on the wavelength $\lambda$ of the signal.

At wavelengths much greater than 1530 nm, in the absence of propagation losses P (curve 40), the emission coefficient g* (curve 42) is greater than the absorption coefficient $\alpha$ (curve 41). In this example, the losses caused by the photonic band gap (PBG) are greater than the emission coefficient g* at wavelengths above 1530 nm, and for wavelengths below 1520 nm, the losses are less than the emission coefficient g*.

An EDFA amplifier, for example, will correctly and mainly amplify the signals in bands C and L. In order to correctly and mainly amplify the signals in the S band, meaning at wavelengths less than 1530 nm, the application of propagation losses P (curve 40) is necessary. These losses are very high at wavelengths around and just above 1530 nm, and prevent amplification at these wavelengths. Gain is then available in the S band.

FIG. 5 depicts the change in the gain G obtained with the previously described amplification device based on the signal's wavelength $\lambda$. The curve 50 shows a relatively high gain for wavelengths $\lambda$ less than 1520 nm, which shows the contribution of the inventive amplification device. Additionally, the gain curve 50 is flat, meaning that the gain is relatively constant as a function of the wavelength. This is an inherent characteristic of the inventive amplification device, which could advantageously be used in other applications.

Above, an amplification device in the S band was described for illustrative purposes. Naturally, the same principle and the same fiber are used to construct an emission device such as a laser emitting within that same band S.

The invention claimed is:

1. A device comprising:
a photonic band gap optical fiber including a solid core made up of a rare earth-doped silica glass with a refraction index of $n_c$, surrounded by an optical cladding including N pairs of silica layers around the core, in which N is a whole number greater than 2, each pair being made up of a first inner layer of silica, the first inner layer having a thickness $d_i$, and a refraction index $n_i$, the refraction index $n_i$ of the first inner layer being greater than the refraction index $n_c$ of the core, the first inner layer being covered by a second outer layer in contact with the first inner layer, the second outer layer being made of silica, the second outer layer having a thickness $d_e$ and a refraction index $n_e$, the refraction index $n_e$ of the second outer layer being less than the refraction index $n_i$ of the first inner layer, the photonic band gap optical fiber configured to create signal propagation losses in order to attenuate signals within C and L bands which enables amplification of at least one signal within an S band over the entire length of the photonic band gap optical fiber.

2. A device according to claim 1, wherein the thickness $d_e$ of the outer layer is greater than the thickness $d_i$ of the inner layer for the same pair.

3. A device according to claim 2, wherein the thickness $d_e$ of the outer layer is twice the thickness $d_i$ of the inner layer.

4. A device according to claim 1, wherein the core is made up of a rare earth doped silica fiber chosen from among erbium, ytterbium, and neodyme.

5. A device according to claim 4, wherein the rare earth is dispersed within at least one part of the core.

6. A device according to claim 1, wherein the refraction indices of the inner layers are equal.

7. A device according to claim 1, wherein the refraction indices of the outer layers are equal.

8. A device according to claim 7, wherein the refraction indices of the outer layers are equal to the core's index.

9. A device according to claim 1, wherein the number N of pairs of layers is at least equal to 5.

10. A device according to claim 1, wherein the radius r of the fiber is at least twice the radius R of the core.

11. A device according to claim 1, wherein at least one of the first inner layer and the second outer layer is made of doped silica.

* * * * *